April 5, 1938.   S. M. DOVER   2,113,251
MIRROR MOUNTING MEANS
Filed March 19, 1937
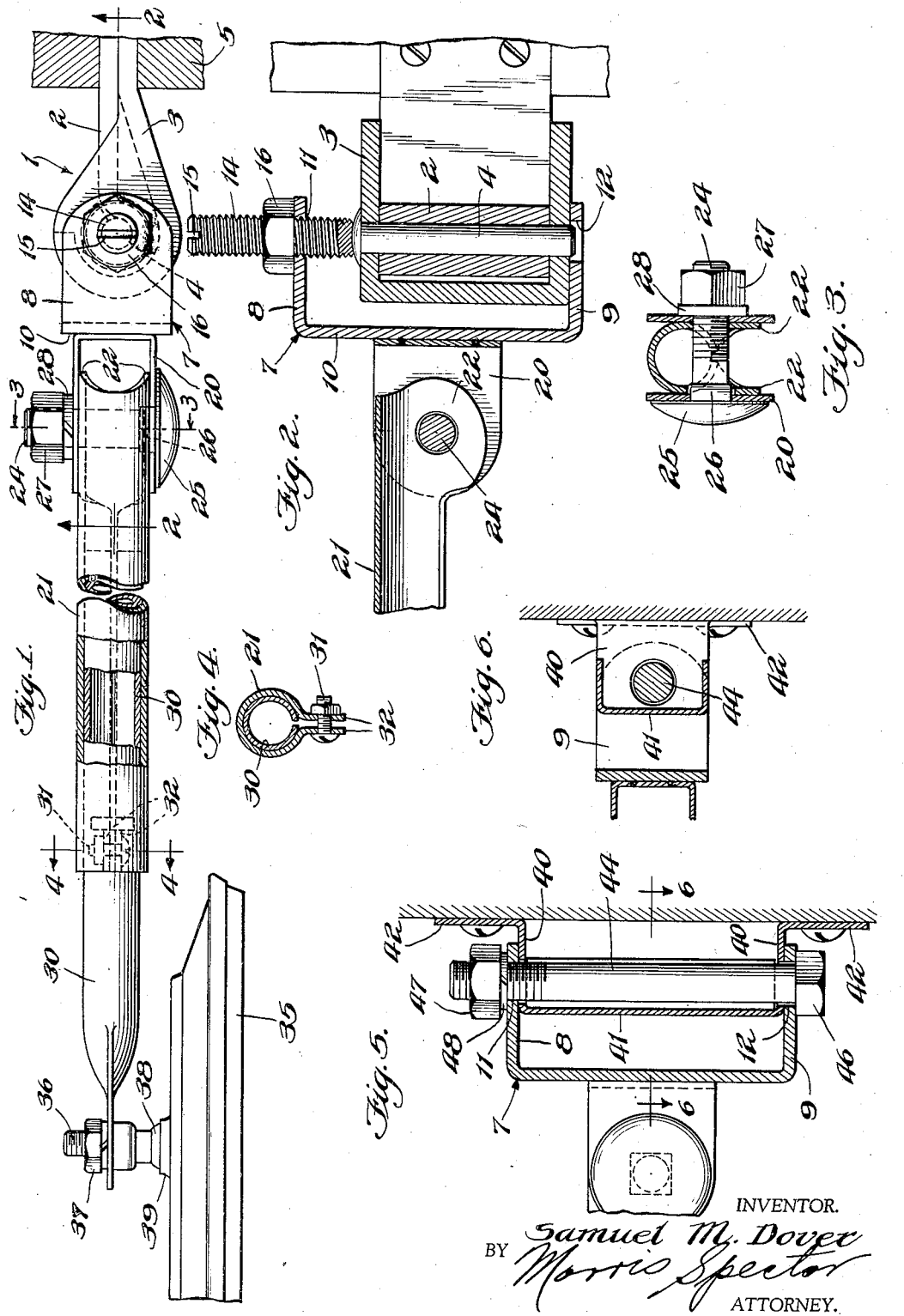
INVENTOR.
Samuel M. Dover
BY Morris Spector
ATTORNEY.

Patented Apr. 5, 1938

2,113,251

UNITED STATES PATENT OFFICE 2,113,251

MIRROR MOUNTING MEANS

Samuel M. Dover, Chicago, Ill.

Application March 19, 1937, Serial No. 131,891

1 Claim. (Cl. 248—205)

This invention relates to rear view mirrors, especially such as are mounted on the outside of automobile trucks or the like, to give the driver a view of the roadway to the rear of the truck, although the invention is not limited to such use of the mirror. More particularly, the invention relates to the construction of a bracket or mounting means for supporting the mirror.

Rear view mirrors for automobiles are now made with different types of mounting brackets, some being made with a bracket adapted for mounting the mirror on the hinge of the door of the automobile, and others being provided with a bracket for mounting the mirror directly upon the body of the automobile. This requires the dealer to carry at least two types of mirrors in stock. It is an object of the present invention to provide a bracket which can be used in connection with a mirror support designed for mounting on the hinge of an automobile so as to adapt that support for mounting directly upon the body of the automobile. It is a further object of the invention to provide a bracket so arranged that the rear view mirror may be mounted upon any conventional accessible part of the body of the automobile, as from a vertical part or from a horizontal part, and which will give the mirror a complete freedom of motion so that the position of the mirror may be adjusted to suit the requirements of the particular driver.

The attainment of the above and further objects of the present invention will be apparent from the following specification taken in conjunction with the accompanying drawing forming a part thereof.

In the drawing:

Figure 1 is a plan view, in partial section, of a rear view mirror mounted upon the hinge of a door of an automobile;

Figure 2 is a sectional view taken along the line 2—2 of Figure 1;

Figure 3 is a sectional view taken along the line 3—3 of Figure 1;

Figure 4 is a sectional view taken along the line 4—4 of Figure 1;

Figure 5 is a sectional view illustrating the mounting of my improved bracket directly on the body of the automobile, instead of on the door hinge; and Figure 6 is a sectional view taken along the line 6—6 of Figure 5.

Reference may now be had more particularly to the construction illustrated in Figures 1, 2, 3 and 4. A standard door hinge for the door of an automobile is shown at 1, said hinge including a stationary member 2 which is suitably secured to the body of the automobile, and a movable member 3 that is pivoted to the stationary member 2 and supports the automobile door. A hinge pin 4 holds the two members together and constitutes the axis about which the door 5 swings. This is one well known type of automobile door hinge. The rear view mirror and its support includes a U-shaped bracket 7 having upper and lower arms 8 and 9 and a back portion 10. The arms 8 and 9 have aligned holes 11 and 12, therein, of which at least one, namely the hole 11, is screwthreaded. The U-shaped bracket 7 is mounted in position to embrace the hinge member 3, being of greater width than the hinge member, and a screw 14 is threaded through the hole 11 in the arm 8 until it is brought into engagement with the top of the hinge pin 4. Further tightening of the screw 14 by means of the screw driver slot 15 causes the lower arm 9 to grip the lower end of the bracket 2 rather tightly, and it increases the pressure between the bottom of the screw 14 and the head of the hinge pin 4, so that the bracket 7 is firmly secured in place. The lower end of the screw 14 is curved to fit over the head of the hinge pin 4. The bracket 7 may be adjusted to any desired angular position about the axis of the hinge pin 4 and then secured in position by tightening the screw 14 and then tightening the lock nut 16. A U-shaped joint member 20, of a generally U-shape, is welded or otherwise permanently secured to the back 10 of the U-shaped bracket 7. A longitudinally split tubular arm 21 having one end thereof flattened to form a pair of ears 22—22 is inserted between the arms of the joint member 20 and pivotally secured in place by a pin 24. The pin has a head 25 with a short square shank portion 26 that extends through a square hole in one of the arms 20, and a threaded shank that extends through the other arm 20 and receives a nut 27 which may be tightened to secure the arm 21 in any desired angular position between the arms of the joint member 20. A split lock washer 28 is provided for holding the parts in their relatively adjusted position.

A mirror supporting tube 30 telescopes within the tubular arm 21 and is locked in adjusted position by means of a short screw 31 that extends through two lugs 32—32 formed at the outer end of the tubular arm 21 so as to draw the edges of the slot in the arm 21 together and thus cause the arm 21 to tightly grip the tube 30. A mirror 35 is supported at one end of the tube 30 by means of a stud 36 that extends through a flattened end portion of the tube 30 and is locked in place by a lock nut 37, the mirror being mounted on the stud 36 by means of a ball and socket joint. The ball of the joint is indicated at 38 and enters into a socket 39 at the rear of the mirror. This allows for universal angular movement of the mirror 35 with respect to the stud 36.

It is to be noted that the mirror may be moved longitudinally towards and away from the body of the automobile by merely loosening the screw 31 and telescoping the tubes 30 and 21 in one direction or the other. The arm 21 may be swung vertically about the pin 24 as an axis, to bring the mirror to the desired horizontal level, and the entire unit can be swung horizontally about the hinge pin 4 as an axis to bring the mirror to a proper longitudinal distance from the observer.

The tubes 21 and 30 are formed of sheet metal, which makes them quite inexpensive. Likewise, the joint member 20 and the bracket member 7 are formed of sheet metal.

If desired the bracket 7 may be mounted directly upon the body of an automobile, instead of upon the hinge thereof. This is illustrated in Figures 5 and 6. In these figures the bracket 7 is shown as embracing the flanges 40—40 of a channel-shaped clip 41. The flanges 40 of the clip are provided with outwardly extending ears 42 for securing the clip 41 to the body of an automobile. A bolt 44 is extended through the aligned holes 12 and 11 of the bracket 7 and through correspondingly aligned holes in the clip 41, it being noted that the holes in the clip are not threaded. The bolt is threaded through the hole 11 in the arm 8 of the bracket 7. As the bolt is tightened, after the head 46 thereof engages the arm 9 of the bracket, it draws the arms 8 and 9 together into firm gripping engagement with the flanges 40—40 of the clip 41 and thus holds the bracket in the desired angular position about the clip 41. A lock nut 47 and a split washer 48 lock the bolt 44 in position.

In compliance with the requirements of the patent statutes I have here shown and described a preferred embodiment of my invention. It is, however, to be understood that the invention is not limited to the precise constructions here shown, the same being merely illustrative of the principles of the invention. What I consider new and desire to secure by Letters Patent is:

Means for mounting a rear view mirror of the type including a U-shaped bracket having apertured arms adapted to embrace and be secured to the hinge of an automobile door, at least one of the bracket apertures being screwthreaded, said means comprising a clip adapted to be secured to the body of an automobile and having apertures registering with the apertures of the bracket, and securing means passing through the apertures of the bracket and the clip and through the threads in the bracket aperture.

SAMUEL M. DOVER.